United States Patent
Angst et al.

(10) Patent No.: US 9,647,462 B2
(45) Date of Patent: May 9, 2017

(54) HEARING INSTRUMENT COMPRISING A RECHARGEABLE POWER SOURCE

(75) Inventors: Jan Angst, Hirzel (CH); Erdal Karamuk, Maennedorf (CH); Hilmar Meier, Zurich (CH); Roland Hug, Hinwil (CH); Andi Vonlanthen, Oberrohrdorf (CH)

(73) Assignee: Sonova AG, Staefa (CH)

( * ) Notice: Subject to any disclaimer, the term of this patent is extended or adjusted under 35 U.S.C. 154(b) by 741 days.

(21) Appl. No.: 13/878,119

(22) PCT Filed: Oct. 19, 2010

(86) PCT No.: PCT/EP2010/065720
§ 371 (c)(1),
(2), (4) Date: May 30, 2013

(87) PCT Pub. No.: WO2011/000974
PCT Pub. Date: Jan. 6, 2011

(65) Prior Publication Data
US 2013/0243230 A1    Sep. 19, 2013

(51) Int. Cl.
*H04R 25/00*    (2006.01)
*H02J 7/00*    (2006.01)
*H02J 7/02*    (2016.01)

(52) U.S. Cl.
CPC .............. *H02J 7/00* (2013.01); *H04R 25/554* (2013.01); *H02J 7/025* (2013.01); *H04R 25/602* (2013.01);
(Continued)

(58) Field of Classification Search
CPC ............ H04R 2225/31; H04R 2225/33; H04R 25/554; H04R 25/55; H04R 25/556;
(Continued)

(56) References Cited

U.S. PATENT DOCUMENTS 3,712,962 A * 1/1973 Epley ................... H04R 25/606
310/331
4,048,593 A * 9/1977 Zillman ................... H03H 1/00
333/168
(Continued)

FOREIGN PATENT DOCUMENTS

DE         36 23 304 A1    1/1988
DE         3623304 A1 *    1/1988    ............... H03K 3/53
(Continued)

OTHER PUBLICATIONS

Aleksandr Belousov, Single Capacitor Powers Audio Mixer, Electronics Design, Strategy, News, Mar. 14, 1997, XP002643346, Retrieved From the Internet: URL:http://www.edn.com/article/487277-EDN_Access_03_14_97_Single_capacitor_powers_audio_mixer.php, [retrieved on Jun. 20, 2011], the whole document.

*Primary Examiner* — Huyen D Le
(74) *Attorney, Agent, or Firm* — David S. Safran

(57) ABSTRACT

A hearing instrument having an audio signal source for providing for audio signals; an audio signal processing unit for processing said audio signals; a unit to be worn at or in a user's ear or to be implanted in the user's head for stimulating the user's hearing according to the processed audio signals, and a rechargeable power source, in which the rechargeable power source is a wound capacitor comprising a capacitor foil arrangement which has at least a first electrically conducting layer, a second electrically conducting layer and a dielectric layer in-between and which is wound in a manner so as to form an induction coil for generating a current for charging of the capacitor when exposed to an external alternating electromagnetic field generated by a charging device.

24 Claims, 3 Drawing Sheets

(52) U.S. Cl.
CPC ........ *H04R 25/606* (2013.01); *H04R 2225/31* (2013.01)

(58) Field of Classification Search
CPC .... H04R 25/602; H04R 25/30; H04R 1/1025; H04R 25/606; H02J 7/025; H02J 7/045; H02J 7/044; H02J 7/0013; H02J 7/0044; H02J 7/0054; H02J 15/00; H02J 7/00; H01M 2/10922; H01M 10/46
USPC ........ 381/323, 312, 314, 330, 331; 320/106, 320/108, 166
See application file for complete search history.

(56) References Cited

U.S. PATENT DOCUMENTS

| | | | | |
|---|---|---|---|---|
| 5,646,815 A | * | 7/1997 | Owens | H01G 9/042 361/502 |
| 7,023,687 B2 | * | 4/2006 | Sterzel | H01G 4/005 361/303 |
| 7,990,679 B2 | | 8/2011 | Ehrenberg et al. | |
| 8,224,007 B2 | | 7/2012 | Petersen et al. | |
| 2008/0137890 A1 | * | 6/2008 | Petersen | H01M 4/66 381/323 |
| 2008/0316678 A1 | * | 12/2008 | Ehrenberg | H01G 9/058 361/503 |
| 2009/0010462 A1 | * | 1/2009 | Ekchian | H01M 2/1022 381/312 |
| 2010/0068629 A1 | * | 3/2010 | Gordon | H01M 4/06 429/325 |
| 2012/0170781 A1 | * | 7/2012 | Klemenz | H04R 25/554 381/323 |
| 2014/0176060 A1 | * | 6/2014 | Vorperian | H04R 25/55 320/108 |

FOREIGN PATENT DOCUMENTS

| | | |
|---|---|---|
| EP | 0 376 948 B1 | 7/1990 |
| WO | 99/55131 A2 | 11/1999 |
| WO | 2006/077192 A1 | 7/2006 |

* cited by examiner

HEARING INSTRUMENT COMPRISING A RECHARGEABLE POWER SOURCE

BACKGROUND OF THE INVENTION

Field of the Invention

The present invention relates to a hearing instrument comprising an audio signal source (typically a microphone arrangement) for providing audio signals, an audio signal processing unit for processing the audio signals, means to be worn at or in a user's ear or to be implanted in the user's head for stimulating the user's hearing according to the processed audio signals, and a rechargeable power source.

Description of Related Art

Hearing instruments are typically powered by an electrochemical battery which may be replaceable (disposable) or rechargeable. Rechargeable batteries store electric energy in chemical form. Since the maximum charging current typically is relatively low, charging of batteries takes quite a long time. Further, the lifetime of rechargeable batteries is limited by the number of charging cycles. However, the energy density is relatively high.

Another option for storing electric energy is to use capacitors, wherein the electric energy is stored as an electric field between two capacitor plates. Wearing of the capacitor due to the charging cycles is very small, and the charging currents may be high. However, the energy density typically is much lower than in electrochemical batteries.

A specific type of capacitors having high energy densities is an electrochemical double layer capacitor (EDLC), wherein an electrolyte layer between the capacitor plates is formed and wherein an electrically conducting material having very high surface area, such as activated carbon, is wetted by the electrolyte. The contact of the electrolyte with the surface of the large surface material creates an electrical double layer of charge carriers of opposed polarity having a thickness of only a few molecular layers which do not move. A separator layer is provided between the electrodes in order to prevent direct electric contact between the two electrodes. Such EDLCs have a very high energy density.

U.S. Pat. No. 8,224,007 B2 relates to a rechargeable electrochemical battery to be used in a hearing aid, wherein the battery is based on thin film technology and consists of a wire-like structure which is wound to form an induction coil which may be used both for charging purposes and as a transmitting or receiving antenna for communication purposes. The wire-like structure consists of a radial sequence of concentric hollow cylindrical layers forming the current collectors, anode, cathode and electrolyte.

International Patent Application Publication WO 99/55131 A2 relates to an electrical energy storage unit for a hearing aid, wherein a foil-like capacitor, i.e., a capacitor film, is provided in the shape of a hollow cylinder which is surrounded by an induction coil used for charging of the capacitor coil.

German Patent Application DE 36 23 304 A1 relates to a film capacitor which is wound in the shape of a hollow cylinder forming an induction coil, with such capacitor arrangement being used for creating high energy electromagnetic pulses. One end of one of the two electrode foils and the opposite end of the other one of the electrode foils are provided with a contact, with the electric circuit for discharging of the capacitor being closed by closing a switch provided between the two contacts, whereby the discharging current creates an electromagnetic induction field. Also examples of a capacitor having more than two electrode layers are described.

European Patent Application EP 0 376 948 B1 relates to an ignition system of internal combustion engines comprising a capacitor comprising two metallic conductor sheets wound in a role, wherein the wound capacitor also serves as the inductance required in the ignition circuit to generate ignition sparks.

U.S. Pat. No. 4,048,593 relates to an inductive-capacitive network used as a filter or a transformer, The network comprises a structure consisting of one or more sheets of dielectric material having one or more conductive sheets positioned on each dielectric sheet, wherein the sheet assembly is turned into a spiral configuration.

U.S. Pat. No. 7,023,687 B2 relates to a capacitor having a very high energy density which is made of a porous shaped body of a catalyst support material, wherein the surface of the porous body is coated with a first electrically conductive layer, a barium-titanate layer and a second electrically conductive layer.

SUMMARY OF THE INVENTION

It is an object of the invention to provide for a hearing instrument comprising a rechargeable power source which has a relatively high capacity and requires relatively little space, which can be charged relatively fast and in a convenient manner and which has a relatively long lifetime.

According to the invention, this object is achieved by a hearing instrument as described herein.

The invention is beneficial in that, by providing the rechargeable power source as a wound capacitor comprising a capacitor foil arrangement having at least a first electrically conducting layer, a second electrically conducting layer and a dielectric layer in between and which is wound in a manner so as to form an induction coil for generating a current for charging of the capacitor when exposed to an external alternating electromagnetic field generated by a charging device, the space required by the power source is minimized, while the need for a separate induction coil used for convenient contact-less charging is eliminated, fast charging is enabled due to the relatively high charging currents allowed by a capacitor compared to a battery, and a relatively long lifetime of the rechargeable power source can be achieved due to the low degrading of capacitors per charging/discharging cycle.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
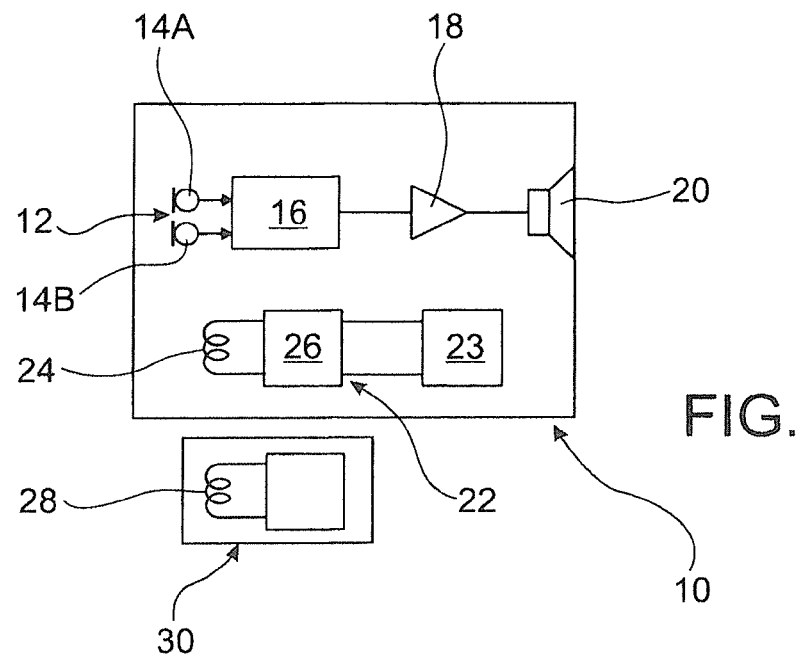
FIG. 1 is a schematic block diagram of an example of a hearing instrument according to the invention.

In FIG. 1 a schematic block diagram of a hearing aid 10 is shown which comprises a microphone arrangement 12 which typically comprises at least two spaced-apart microphones 14A, 14B for capturing audio signals from ambient sound, an audio signal processing unit 16 for processing the captured audio signals, a driver/amplifier 18 for driving an output transducer 20 (typically a loudspeaker) according to the processed audio signals, and a rechargeable power source 22. In order to enable contactless, i.e., wireless, charging of the power source 22, typically an induction coil 24 is used which is connected via a charging circuitry 26 to an electrical energy storage element 23 of the power source 22 in order to supply a charging current to the electrical energy storage element 23 which is generated from the voltage induced at the charging coil 24 by an alternating electromagnetic field generated by a coil 28 of a corresponding charging device 30. Typically, the power source 22 is charged during times when the hearing aid 10 is not used, for example, during night.

According to the present invention, the induction coil is formed by the electrical energy storage element. More in detail, the rechargeable power source is formed by a wound capacitor comprising a capacitor foil arrangement which forms both a capacitor for storing electric energy and an induction coil for generating a current for charging of the capacitor when exposed to an external alternating electromagnetic field generated by the charging device 30. The capacitor foil arrangement comprises at least a first electrically conducting layer, a second electrically conducting layer and a dielectric layer in between. Also, the wound capacitor comprises a charging circuitry 26 connected to the capacitor foil arrangement.

Figure 2:
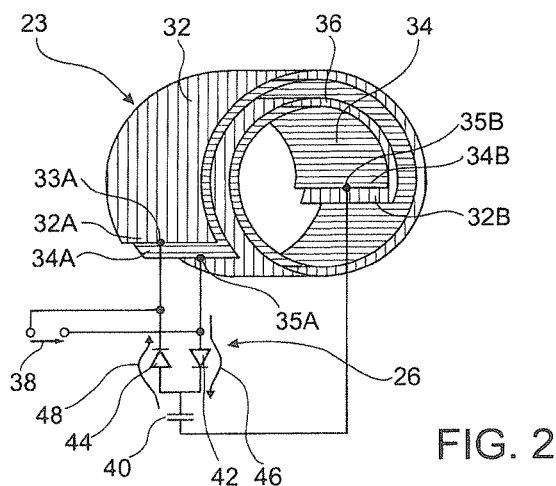
FIG. 2 is a schematic perspective view of an example of a rechargeable power source to be used with the present invention, shown together with an example of a circuitry to be used for charging and discharging the power source.

In the example shown in FIG. 2, the capacitor foil arrangement 23 comprises two electrically conducting layers, namely a first layer 32 and a second layer 34, which are separated by a dielectric layer 36 in between. The layers 32, 34, 36 are arranged parallel to each other and are wound in a manner so as to form an induction coil having the shape of a hollow cylinder.

Each layer comprises two axial ends (which correspond to the two ends of a cylinder) and two "peripheral ends" 32A, 32B and 34A, 34B, respectively (these "peripheral ends" form the ends of the layers 32, 34, 36 with regard to the winding direction and extend in the axial direction of the cylinder formed by the foil arrangement 23). The peripheral end of the first electrically conducing layer 32 which is adjacent to the peripheral end 34A of the second electrically conducting layer 34 is designated by 32A, and the peripheral end of the first electrically conducting layer 32 adjacent to the other peripheral end 34B of the second electrically conducting layer 34 is designated by 32B.

In the example shown in FIG. 2 the adjacent peripheral ends 32A and 34A are provided with electrical contacts 33A and 35A, respectively, and the other peripheral end 34B of the second electrically conducting layer 34 is provided with an electrical contact 35B. The peripheral end 32B of the first electrically conducting layer 32 adjacent to the peripheral end 34B does not comprise an electrical contact and thus is insulated. The contacts 33A, 35A at the adjacent peripheral ends 32A, 34A are used for discharging the wound capacitor 23, whereby inductive electromagnetic radiation caused by the discharging current is avoided (such electromagnetic radiation would be generated if the capacitor 23 was discharged by using the contact 35B at the opposite peripheral end 34B rather than using the contact 35A). In the example of FIG. 2, the load, i.e., the hearing aid electronics, is supplied at 38 with the discharge voltage provided by the capacitor 23. Alternatively, the load may be connected to the contact 35B of the second electrically conducting layer 34 rather than to the contact 35A.

The charging circuitry 26 comprises an auxiliary capacitor 40, a first diode 42 and a second diode 44. A first contact of the auxiliary capacitor 40 is connected to the peripheral end 34B of the second electrically conducting layer 34 via contact 35B, whereas the other contact of the auxiliary capacitor 40 is connected in parallel via the first diode 42 to the contact 35A of the other peripheral end 34A of the second electrically conducting layer 34 and via the second diode 44 to the peripheral end 32A of the first electrically conducting layer 32 adjacent to the peripheral end 34A to which the first diode 42 is connected to. The diodes 42, 44 are connected with opposite polarities to the auxiliary capacitor 40, i.e., for a given current direction one of the diodes conducts the current while the other one is reverse-biased. By arranging the diodes 42, 44 in reverse directions it is ensured that during the first half of the cycle of the alternating external magnetic field only one of the diodes allows a current to flow through it, while during the second half of the cycle of the alternating external electromagnetic field only the other one of the diodes allows a current to flow through it.

In the following, it will be assumed that during the first half of the cycle of the alternating external electromagnetic field the first diode 42 allows a current to flow through it, i.e., it is assumed that the voltage induced in the capacitor foil arrangement of the capacitor 22 is such that it drives a current from the second electrically conducting layer 34 via contact 35A through the first diode 42 to the auxiliary capacitor 40, thereby charging the auxiliary capacitor 40 (this is illustrated by the arrow 46 in FIG. 2). During the second half of the cycle of the alternating external electromagnetic field, the voltage induced in the capacitor foil arrangement has an opposite polarity with regard to the first half of the cycle, so that now a current from the auxiliary capacitor 40 is driven through the second diode 44 to the first electrically conducting layer 32 of the capacitor 22 via the contact 32A (see arrow 48 in FIG. 2). By this mechanism, during each cycle of the external magnetic field, charge is transferred from the second electrically conducting layer 34 to the first electrically conducting layer 32, thereby charging the capacitor foil arrangement, i.e., a capacitor voltage is generated between the two layers 32 and 34, which, once charging is completed, may be supplied to the load at 38.

In the above charging process, the voltage induced in the capacitor foil arrangement during the first half of the cycle serves to charge the auxiliary capacitor 40, whereas during the second half of the cycle of the alternating external electromagnetic field the voltage at the auxiliary capacitor 40, together with the voltage induced in the capacitor foil arrangement, serves to drive a charging current to the capacitor foil arrangement.

Anti-polar arrangements may also provide solutions where both cycles can be used.

Figure 5:
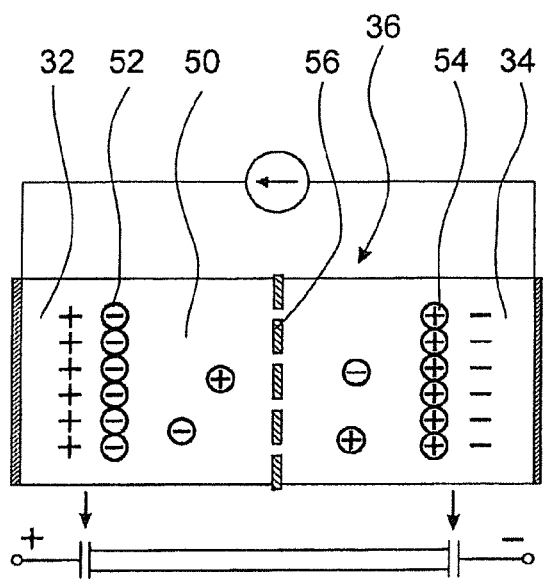
FIG. 5 is a schematic view of an example of a layer structure of a rechargeable power source to be used with the invention.

According to one embodiment, the capacitor foil arrangement may have the structure of an electrochemical double layer capacitor (EDLC), wherein the dielectric layer 36 is formed by an electrolyte 50 which wets the first and second electrically conducting layer 32, 34 and which is suitable to form, when a charging voltage is applied between the first and second electrically conducting layer 32, 34, thin ionic layers of opposite polarity at the surface of the first electrically conducting layer 32 and at the surface of the second electrically conducting layer 34, respectively. In the schematic example of FIG. 5, the electrolyte 50 forms a thin layer 52 of negative ions at the surface of the first electrically conducting layer 32 (which carries positive charges) and a thin layer 54 of positive ions at the surface of the second electrically conducting layer 34 which carries negative charges. Thereby each of the ionic layers 52, 54 forms an electrical double layer with the charges at the surface of the respective layer 32, 34. Each of the ionic layers 52, 54 forms a dielectric layer having a thickness of only a few Ångström (the EDLC shown in FIG. 5 may be described as an in-series connection of two capacitors, as indicated at the bottom of FIG. 5). A separator layer 56 is provided within the electrolyte 50 between the two electrodes 32, 34 in order to prevent direct electrical contact between the electrodes 32, 34 (in the example shown in FIG. 5, the first electrically conducting layer 32 forms the positive electrode, while the second electrically conducting layer 34 forms the negative electrode).

In order to achieve a high energy density, the electrodes 32, 34 are made of a material having a very high surface area, typically a porous material, such as activated carbon.

Figure 6:
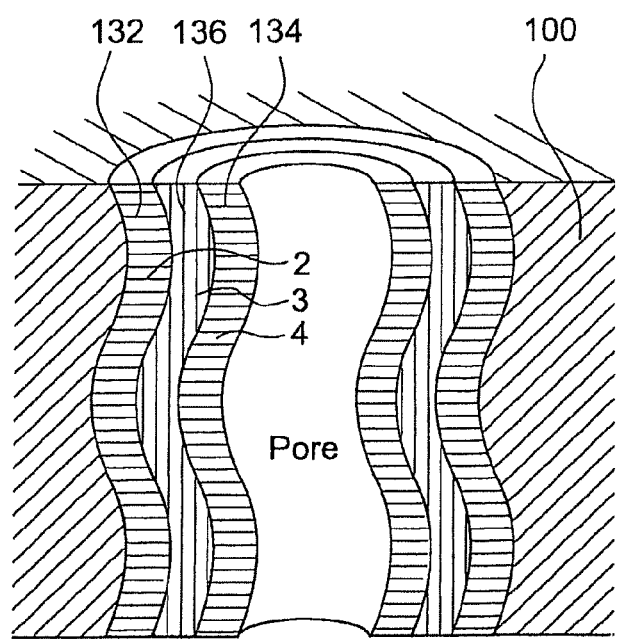
FIG. 6 is a schematic view of another example of a layer structure of a rechargeable power source according to the invention.

According to another embodiment, the capacitor foil arrangement 23 may have a structure as described in U.S. Pat. No. 7,023,687 B1, wherein the first electrically conducting layer 132, the dielectric layer 136 and the second electrically conducting layer 134 are formed on a porous substrate 100, see FIG. 6. The porous body 100 may be made of a catalyst support material, for example, a material based on metal oxides. The first and second electrically conducting layer 132, 134 preferably are made of a metal which is deposited on the surface of the porous body 100 by vapor deposition, sputtering, etc. Once the first layer 132 has been applied, the dielectric layer 136 can be formed by using dispersions of crystalline titanate particles, for example, barium titanate particles, having sizes of less than 10 nm in alcohols, followed by a sintering process. Thereafter the second layer 134 may be applied on top. The dielectric layer 136 preferably has a thickness of 10 to 1,000 nm. Preferably the dielectric layer 136 is ferromagnetic.

Figure 3:
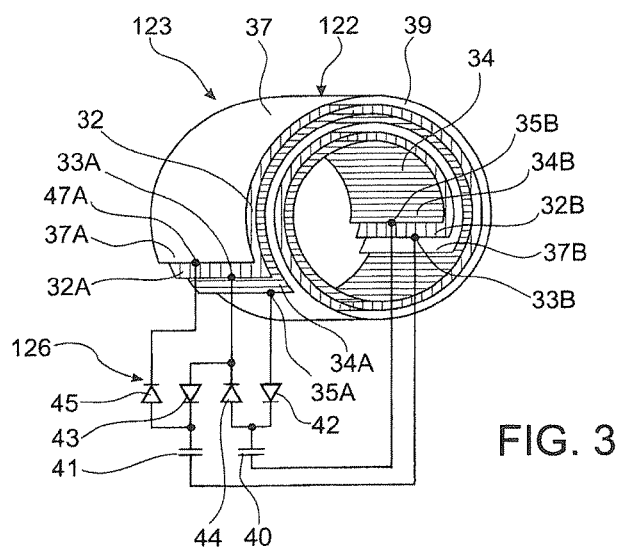
FIG. 3 is a view, like FIG. 2, wherein an alternative embodiment is shown.

The capacitor foil arrangement 123 may comprise more than two electrically conducting layers. An example with three electrically conducting layers 32, 34 and 37 is shown in FIG. 3, wherein the third electrically conducting layer 37 is separated from the first electrically conducting layer 32 by a second dielectric layer 39. By using a third electrically conducting layer the voltage of the capacitor 122 can be increased, whereby the capacity of the capacitor is increased.

In FIG. 3 an example of the charging circuitry 126 is shown which is suitable for a capacitor comprising three electrically conducting layers. The components present in the embodiment of FIG. 2 also are present in the embodiment of FIG. 3. In addition, a second auxiliary capacitor 41 and two additional diodes 43, 45 are provided. One of the contacts of the second auxiliary capacitor 41 is connected to the peripheral end 32B of the first electrically conducting layer 32 via a contact 33B. The other contact of the second auxiliary capacitor 41 is connected in parallel via the third diode 43 to the contact 33A at the peripheral end 32A of the first electrically conducting layer 32. That peripheral end 37A of the third electrically conducting layer 37 which is adjacent to the peripheral ends 32A and 34A of the first and second layers 32, 34 is provided with a contact 47A which is connected to the fourth diode 45. The second auxiliary capacitor 41 is connected in parallel via the third and fourth diode 43, 45 to the contact 33A and 47A, respectively. The diodes 43 and 45 are connected with opposite polarity to the second auxiliary capacitor 41. The peripheral end 37B of the third electrically conducting layer 37, which is adjacent to the peripheral ends 32B and 34B of the layers 32, 34, is not provided with a contact, i.e., it is electrically insulated.

The load may be connected, for example, between the contacts 47A and 35A or between the contacts 47A, 33B.

The capacitor foil arrangement may comprise even more than three electrically conducting layers in order to further increase the capacitor voltage. More complex circuitry, like a Greinacher voltage multiplier circuit, or the like, may be used for utilizing both half-waves of the alternating electromagnetic field. Also, some of the layers of the wound capacitor foil arrangement may serve as the auxiliary capacitor(s) 40, 41 required for the charging process. By generating in such a manner a cascade of (relatively small) voltages the high voltage resistance of dielectric materials. like barium titanate. may be utilized in an optimized fashion and the density of the stored energy may be enhanced.

Figure 4:
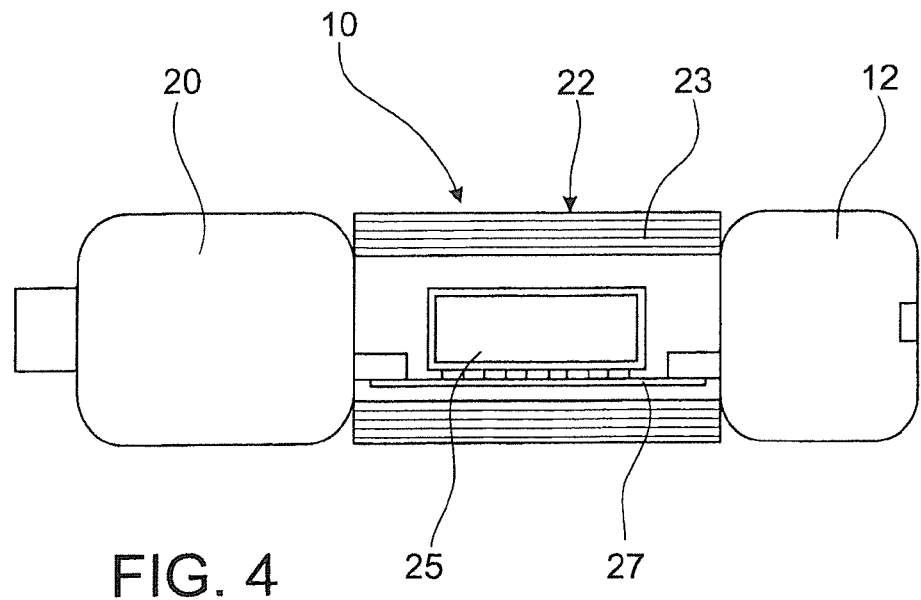
FIG. 4 is a schematic view of an example of a hearing instrument according to the invention including a rechargeable power source.

In FIG. 4, an example of a hearing aid according to the invention is shown in a schematic manner, wherein a wound capacitor foil arrangement 23 is located between a microphone arrangement 12 and a speaker 20, and wherein an electronic unit 25 comprising an audio signal processing unit 16, an amplifier 18 and a charging circuitry 26 is provided in the hollow interior of the wound capacitor foil arrangement 23 on a support structure 27. Also the microphone arrangement 12 and the speaker 20 are attached to the support structure 27.

The present invention in general may be used for all kinds of hearing instruments, such as BTE (behind the ear), ITE (in the ear) or CIC (completely in the canal) type hearing aids.

It also may be used for the external unit of a partially implantable hearing instrument. In such case, the stimulation means is formed by an implantable stimulation assembly for stimulating a middle ear or inner ear component of the hearing of the user, wherein the microphone arrangement and the audio signal processing unit form part of an external unit to be fixed at the patient's head and comprising means for transmitting the processed audio signals via a wireless subcutaneous link to an implantable unit the stimulation assembly.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A hearing instrument comprising:
   an audio signal source for capturing audio signals;
   an audio signal processing unit for processing said audio signals;
   means to be worn at or in a user's ear or to be implanted in a user's head for stimulating a user's hearing according to processed audio signals, and
   a rechargeable power source,
   wherein the rechargeable power source is a wound capacitor comprising a charging circuitry and a capacitor foil arrangement which comprises at least a first electrically conducting layer, a second electrically conducting layer and a dielectric layer in-between the first electrically conducting layer and the second electrically conducting layer and which is cylindrically wound in a manner so as to form a cylindrical induction coil for generating a current for wirelessly charging of the capacitor when exposed to an external alternating electromagnetic field generated by a charging device.

2. The hearing instrument of claim 1, wherein the capacitor foil arrangement forms an electrochemical double layer capacitor.

3. The hearing instrument of claim 2, wherein the dielectric layer is formed by an electrolyte wetting the first and second electrically conducting layer and suitable to form ionic layers of opposite polarity at the first and second electrically conducting layer, respectively, and wherein the first and second electrically conducting layer comprise a porous material.

4. The hearing instrument of claim 3, wherein the porous material comprises activated carbon.

5. The hearing instrument of claim 1, wherein the first and second electrically conducting layer and the dielectric layer are formed on a porous substrate.

6. The hearing instrument of claim 5, wherein the dielectric layer is ferromagnetic.

7. The hearing instrument of claim 6, wherein the dielectric layer comprises barium titanate.

8. The hearing instrument of claim 7, wherein the barium titanate is provided as particles having a size of less than 10 nm.

9. The hearing instrument of claim 8, wherein the barium titanate particles are dispersed in a solution.

10. The hearing instrument of claim 8, wherein the barium titanate particles are sintered to form the dielectric layer.

11. The hearing instrument of claim 5, wherein the first and second electrically conducting layers are metal layers.

12. The hearing instrument of claim 1, wherein the capacitor foil arrangement is adapted to be discharged via discharge contacts provided at a same peripheral end of the first and second electrically conducting layer.

13. The hearing instrument of claim 1, wherein the capacitor foil arrangement is adapted to be charged by said alternating external electromagnetic field in a manner that during first half of a cycle of the alternating external electromagnetic field a voltage induced in the capacitor foil arrangement serves to drive a charging current to an auxiliary capacitor connected to capacitor foil arrangement to charge the auxiliary capacitor and that during a second half of the cycle of the alternating external electromagnetic field a voltage at the auxiliary capacitor, together with the voltage induced in the capacitor foil arrangement, serves to drive a charging current to the capacitor foil arrangement.

14. The hearing instrument of claim 13, wherein, for charging of the capacitor foil arrangement, a first contact of the auxiliary capacitor is connected to a first peripheral end of the second electrically conducting layer and a second contact of the auxiliary capacitor is connected in parallel via a first diode to a second peripheral end of the second electrically conducting layer and via a second diode to a second peripheral end of the first electrically conducting layer adjacent to the second peripheral end of the second electrically conducting layer, with the first and second diode being connected with opposite polarities to the second contact of the auxiliary capacitor.

15. The hearing instrument of claim 14, wherein, for discharging of the capacitor foil arrangement, an electrical load is connected to the second peripheral end of the first electrically conducting layer and the second peripheral end of the second electrically conducting layer, respectively.

16. The hearing instrument of claim 14, wherein a first peripheral end of the first electrically conducting layer adjacent to the first peripheral end of the second electrically conducting layer is electrically insulated.

17. The hearing instrument of claim 14, wherein the capacitor foil arrangement comprises a third electrically conducting layer and a second dielectric layer separating the first electrically conducting layer and the third electrically conducting layer.

18. The hearing instrument of claim 17, wherein a second auxiliary capacitor is provided, wherein, for charging of the capacitor foil arrangement, a first contact of the second auxiliary capacitor is connected to a first peripheral end of the first electrically conducting layer adjacent to the first peripheral end of the second electrically conducting layer, and the second contact of second auxiliary capacitor is connected in parallel via a third diode to the second peripheral end of the first electrically conducting layer and via a fourth diode to a second peripheral end of the third electrically conducting layer adjacent to the second peripheral end of the first electrically conducting layer, wherein the third and fourth diode are connected with opposite polarities to the second contact of the second auxiliary capacitor, wherein the second diode and the third diode are connected with opposite polarities to the first electrically conducting layer.

19. The hearing instrument of claim 13, wherein each auxiliary capacitor is formed by layers of the capacitor foil arrangement.

20. The hearing instrument of claim 1, wherein the audio signal source is a microphone arrangement for capturing first audio signals from ambient sound.

21. The hearing instrument of claim 1, wherein the hearing instrument is a BTE, ITE or CIC hearing aid.

22. The hearing instrument of claim 1, wherein the foil arrangement comprises a single, continuous, foil arrangement cylindrically wound to form a continuous cylindrical induction coil.

23. A method of charging a hearing instrument having a rechargeable power source having a wound capacitor comprising a charging circuitry and a capacitor foil arrangement which comprises at least a first electrically conducting layer, a second electrically conducting layer and a dielectric layer in-between the first electrically conducting layer and the second electrically conducting layer and which is cylindrically wound in a manner so as to form a cylindrical induction coil for generating a current for wirelessly charging of the capacitor when exposed to an external alternating electromagnetic field generated by a charging device, comprising the steps of:

generating alternating external electromagnetic field for charging of the capacitor foil arrangement by inducing a voltage in the capacitor foil arrangement during a first half of a cycle of the alternating external electromagnetic to drive a charging current to an auxiliary capacitor connected to the capacitor foil arrangement to charge the auxiliary capacitor, and using a voltage at the auxiliary capacitor together with the voltage induced in the capacitor foil arrangement to drive a charging current to the capacitor foil arrangement during a second half of the cycle of the alternating external electromagnetic field.

24. The method of claim 23, wherein the foil arrangement comprises a single, continuous, foil arrangement cylindrically would to form a continuous cylindrical induction coil.

* * * * *